Oct. 6, 1970 M. SILVERBERG 3,532,425

GRAPHIC DISTORTION APPARATUS

Filed Oct. 2, 1967

INVENTOR.
MORTON SILVERBERG
BY Ronald Zibelli
ATTORNEYS

United States Patent Office 3,532,425
Patented Oct. 6, 1970

3,532,425

GRAPHIC DISTORTION APPARATUS

Morton Silverberg, Rochester, N.Y., assignor to Xerox Corporation, Rochester, N.Y., a corporation of New York Filed Oct. 2, 1967, Ser. No. 672,192
Int. Cl. G03b 27/68
U.S. Cl. 355—52 5 Claims

ABSTRACT OF THE DISCLOSURE

A scrambling apparatus for information bearing documents wherein elemental line images of the original document are projected by a swivelling mirror onto a photosensitive medium. Successive line images are displaced from each other in a direction in the plane of motion of the reflecting mirror.

Figures 1, 2A, 2B:
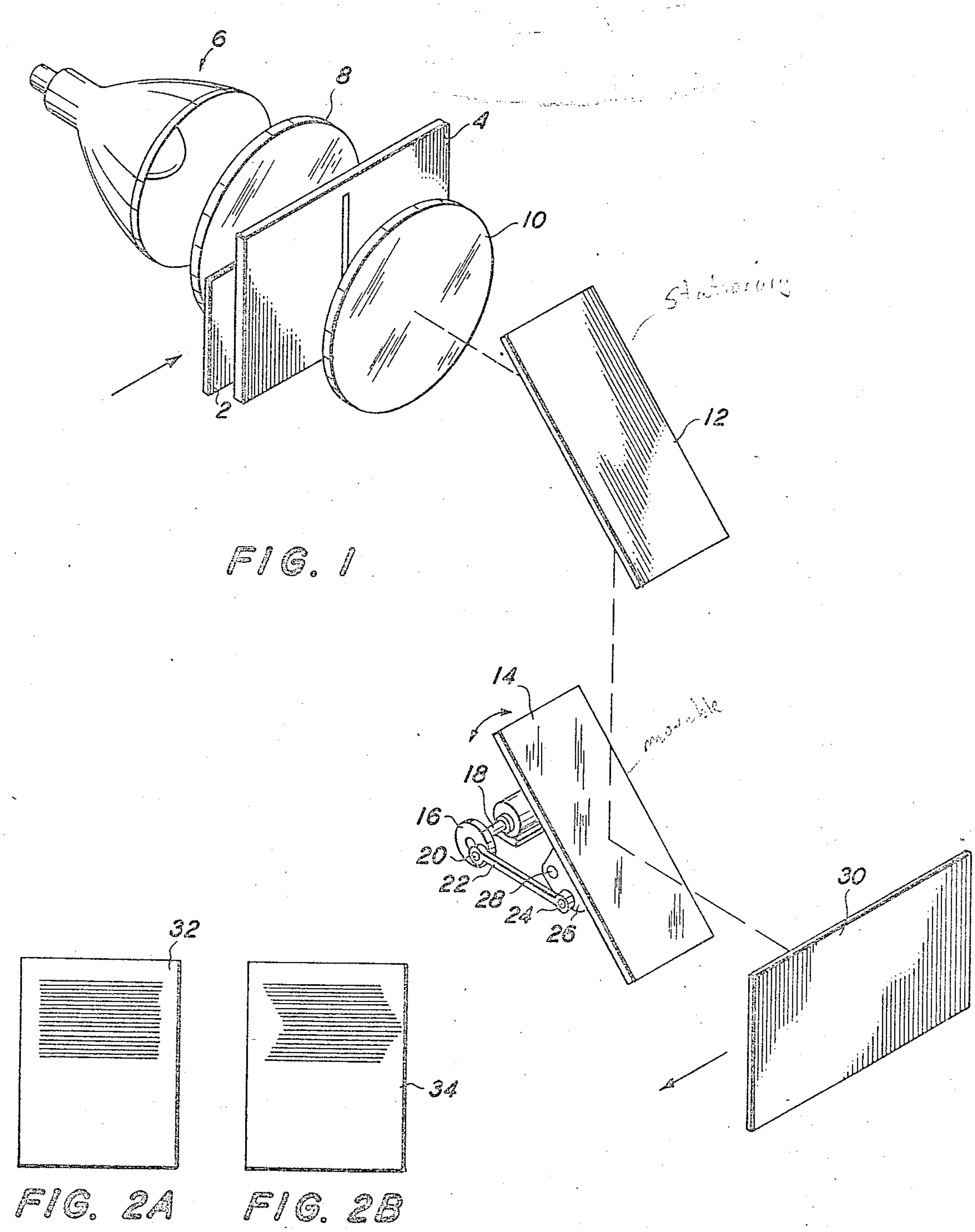

This invention relates generally to graphic distorting apparatus, and more specifically to apparatus for scrambling graphic information by varying the relative spacail relationships of various points constituting the original graphic information.

Both in business and government, it is many times desirable to restrict the dissemination of graphically presented information to selected individuals or groups of individuals. This graphic information may take the form of either typed memoranda, reports, or pictorial representations such as maps. There are many approaches to implement this restriction. One expedient would be the safeguarding of a particular graphic document so that unauthorized individuals may not have access to the contents thereof. Additionally, it is possible to produce a modified version of the original which in some manner contains the same information but in an apparently unintelligible form. This second approach may be very complex, and for example, utilizes a cryptographic scheme to encode the original document. Along with being complex, this technique is expensive and time consuming and is reserved for use only in those instances where the document to be encrypted contains information of a highly secret nature.

Generally, however, the situation is one in which information borne by a particular document is of a nature that would normally not be considered highly secret but rather of a general business nature and as being protected from indiscriminate exposure chiefly because of the proprietary or pecuniary interest therein maintained by the disseminator or other person. In this situation, the present invention finds its most ready application as a direct result of its simple operation and relatively inexpensive structural components.

The instances previously described and the foregoing paragraph lend themselves to a fairly simple technique for rendering the graphic document illegible. A well-known technique generally employed involves the use of a fiber-optic bundle to randomly scramble the informational content of the document so that the resulting scrambled version thereof is completely unintelligible to the observer. This is accomplished in the simplest case by utilizing a bundle of such fiber-optics formed at one end in an orderly array of rows and columns. The other end of the bundle has the various individual fibers randomly intertwined so that the image put in at the orderly arrayed terminal of the bundle egresses at the disarrayed or intertwined terminal end in the form of the desired randomly scrambled pattern. The system just described is used by positioning the ordered end of the fiber bundle adjacent the document to be scrambled and the disarrayed and adjacent a photosensitive surface or the like on which the scrambled version of the original document is to be produced.

In order to decipher the randomly scrambled documents such as produced by the prior art scramblers, a simple reversal of the scrambling process is performed. In doing this reversal, the randomly located points on the scrambled document are detected by the individual fibers within the bundle and transmitted to the other terminal of the bundle where they are realigned at their former positions on the original document. In this manner, the original document is reconstituted from the scrambled version. It will be appreciated that the random location of such points on the scrambled document necessitates an extremely precise aligning or registration of the scrambled document with the disarrayed terminal of the fiber-optic bundle during the reconstitution process. If the disarrayed end of the bundle is out of registration to any degree with the points on the scrambled document, the fiber bundle will detect these points that on the original document are spacially far removed from the desired points. This results in a completely unacceptable reconstituted document which may not be any more intelligible than the scrambled version thereof.

It is accordingly an object of the present invention to provide an improved apparatus for producing a ordered distortion in graphic information.

It is another object of the present invention to improve graphic information scrambling.

These and other objects which may become apparent or accommplished in accordance with the principles of the present invention wherein line information from a document is projected through a slit scanner to the reflected surface of a mirror, for example. The reflected image from the mirror is then reflected from a second mirror onto a photosensitive medium. This second mirror is swivelled about an axis so as to reflect successive lines of information at different angles from the second mirror thereby producing horizontal displacements of these successive lines of information on the photosensitive medium.

These and other objects of the present invention may be more clearly understood after reference to the following description which may be read in connection with the accompanying drawings wherein:

FIG. 1 is a perspective view of the apparatus in accordance with the present invention; and, FIGS. 2A and 2B illustrate samples of graphic information before and after scrambling by the apparatus of the present invention.

Referring to FIG. 1 a scrambling apparatus is shown which operates preferably on information in the form of a document bearing alphanumeric or graphic information depicted generally by the original sheet 2. As shown in FIG. 1, this sheet 2 is moving in the direction indicated by the arrow adjacent thereto.

Associated with the original sheet 2 but fixed relative to the moving original sheet is an optical stop having a slit therein generally designated by the reference numeral 4.

On the side of the original sheet opposite that of the optical stop 4 is a collimating lens 8 which cooperate to project collimated light through the original sheet or document 2. The information on the document coextensive with the slit in the stop 4 acts to modulate this collimated light thereby providing a slit image of an elemental line of the document. This image is optically relayed via a second collimating lens 10 to a reflecting surface, such as mirror 12.

Mirror 12 is inclined at an angle relative to the plane of document 2. This angle of inclination may be any value so long as the reflections of the image are optically compatible with the rest of the apparatus of the present invention as hereinafter described.

The dimensions of the mirror 12 are critical as far as accommodating the line image projected thereto. Obviously, the mirror's reflective surface must be sufficient to reflect all of this line image.

The line image reflected by mirror 12 is directed to the reflective surface of another mirror 14. This reflected image will be hereinafter referred to as the first reflected line image. Mirror 14 may be of the same design as that of mirror 12. However, where mirror 12 is stationary relative to the other structures of the appaatus, mirror 14 is movable within a specific limit.

This oscillatory movement of mirror 14 is characterized by a swivel about an axis in a back-and-forth or seesaw manner as depicted by the double-headed arrow in the figures. The manner in which this swivelling is effected may take various forms. The one illustrated for purposes of this description includes a rotating cam 16 mounted for rotation about an axis shaft 18. The cam may be driven by a suitable source of motive power not illustrated. A coupling pin 20 couples cam 18 to a motion translating rod 22 which is similarly coupled via coupling pin 24 to a circular flange 26. This flange is fixed to an axis rod 28 which is rigidly attached to the nonreflective surface of mirror 14. As the cam 16 is rotated in a counterclockwise direction the motion translating rod 22 moves back and forth or left and right. Each thrust of this rod 22 serves to move flange 26 through a sector of a circle, alternating in direction as cam 16 completes rotation through each 180 degrees.

The effect of this swivel mechanism is to continuously move mirror 14 through a number of planes having a common rotational axis. As mirror 14 swivels, the angle of incidence at which the first reflected line image strikes its reflective surface varies. Accordingly, the angle at which this line image is reflected from the reflective surface of mirror 14 is varied. This reflection may be referred to as the second reflected line image. This variation in reflection angle has the effect of displacing each second reflected line image originating at mirror 14 on the surface of a sheet 30 of photosensitive material.

Therefore, as the mirror 14 swivels in one direction, a certain number of successive second reflected line images will be displaced relative to each other on the surface of photosensitive sheet 30. The motion of mirror 14 in the other direction will project a similar number of successive reflected line images onto the photosensitive sheet 30 in a pattern which is the mirror image of the first succession of images projected while the mirror 14 swivels in the aforementioned one direction. This reflected pattern occurs when a circular cam 16 is employed.

To better understand the displacement described in the foregoing paragraph, reference is made to FIGS. 2A and 2B. The former figure shows only a crude representation of an information-bearing document 32, the information being represented by solid lines parallel to the upper edge as the document would normally be read or viewed. These lines are shown as equal in length and conforming to straight common vertical margins.

FIG. 2B shows the information of document 32 of FIG. 2A in a scrambled condition as sheet 34. The horizontal lines are still of the same length and equally spaced from each other vertically but there is a distinct horizontal displacement between adjacent lines. The vertical margins are no longer limits in the scrambled version. While FIGS. 2A and 2B show only a few horizontal lines depicting image lines of a document, it must be realized that in the practical situation, these horizontal lines are actually minute elemental slices across a complete line of print, for example. The proper selection of the degree of swivel experienced by mirror 14 can result in dividing each letter in a line of print into many such horizontal slices. Displacing each of these subdivisions from each other could be done to such an extent that each letter is no longer discernible as such. In this manner, a complete printed document can be distorted systematically as to scramble its contents until reconstitution of the document is accomplished by reversing substantially the distorting process.

The regularity of the distortion pattern in FIG. 2B is due to the use of a circular cam 16 to produce a continuous and uniform swivel motion on the part of mirror 14. However, the present invention is equally adapted to a nonuniform type of swivel action on mirror 14 as through the use of an eccentric cam in place of cam 16. In this manner, the distortion pattern can be varied for different documents or may even be varied during the processing of a single document.

The range through which the mirror 14 may be swivelled is dictated by the physical dimensions of photosensitive sheet 30. Obviously, the mirror cannot be moved so as to project portions of the second reflected line image off of the photosensitive sheet. Otherwise, the amount of swivel is a matter of choice and design and may depend on the amount of displacement or distortion desired.

The slit size in optical stop 4 preferably is as narrow as optically possible thereby permitting the greatest distortion of a single character or letter.

The only other limitation on the system of the present invention is that the photosensitive sheet moves at substantially the same speed at which the original sheet 2 passes the slit in the optical stop 4.

The photosensitive sheet 30 may include several media from photographic film to xerographic plates and need only be sensitive to the light used and effective at the scanning times employed in the system itself.

To reconstitute a scrambled document, it is only necessary to place the projection system and collimating lens in place of the photosensitive sheet 30 and exchange sheet 2 for another unexposed photosensitive sheet and then reverse the process accordingly.

While the present invention has been described in terms of a specific embodiment, it is clear that in view of the present teaching numerous modifications thereof and deviations therefrom may be readily constructed by those skilled in the art.

While a slit scanning system has been described wherein the projection light source is on the side of the original document opposite the mirror arrangement, the concept of this invention may be readily adapted to a reflective scanning system.

In addition, it should be understood that any graphic information bearing member may be used in the system of the present invention, such as microfilm or other transparent photographic members.

Accordingly, the present invention is to be construed broadly and limited only by the appended claims.

What is claimed is:

1. A graphic information scrambling system for systematically distorting the contents of a constantly moving document comprising:

(a) a substantially collimated light projection system positioned on one side of said document to direct light therethrough;

(b) an optical stop member on the side of said document opposite said one side and having a narrow slit therein, said slit positioned relative to said document as to be substantially perpendicular to its direction of movement and substantially coextensive with one dimension of said document and to transmit light passing through said document from said projection system;

(c) a light sensitive recording medium; and, (d) reflective means positioned relative to said slit and said recording medium for reflecting successive and substantially contiguous elemental images of said document toward said recording medium, groups of said successive elemental images reflected toward said medium being displaced from each other in a direction parallel to the longer dimension of said images.

2. A graphic information distorting system for systematically, distorting the graphic information on a document as it moves in one direction at a uniform rate comprising:
(a) a light projection system on one side of said document;
(b) a light transmissive slit on the side of said document opposite said one side, said slit being transverse to the direction of movement of said document;
(c) a light sensitive recording member defined by a plane;
(d) motion control means for providing an oscillating motion about an axis;
(e) a first mirror fixed relative to said slit and positioned to reflect a light from said projection system which passes through said slit and,
(f) a second mirror positioned relative to said first mirror to receive said reflected light and mechanically coupled to said motion control means to move in a seesaw motion about said axis, said seesaw motion being in a plane substantially perpendicular to the plane defining said light sensitive recording member.

3. A graphic information distorting system for systematically rendering a reproduction of an original document unrecognizable comprising:
(a) projection means for projecting successive elemental images of a document, said elemental images having their longer dimesnion substantial coextensive with one dimension of said document;
(b) a light sensitive recording member; and,
(c) light reflective means positioned to receive said successive elemental images for reflecting successive groups of said elemental images onto different areas of said recording member, the elemental images of each of said reflected groups being displaced from each other in a direction substantially parallel to said dimension.

4. A system as defined in claim 3 wherein the elemental images of alternate ones of said reflected groups have a similar displacement relationship.

5. A graphic information scrambling system for systematically distorting the contents of a constantly moving document comprising:
(a) projection means for projecting one at a time successive elemental images of a document, said elemental images having their longer dimension substantial coextensive with one dimension of said document;
(b) a light sensitive recording medium; and,
(c) reflective means positioned relative to said projection means and said recording medium for reflecting said successive elemental images of said document onto different areas of said recording medium, groups of said successive elemental images reflected onto said medium being displaced from each other in a direction parallel to the longer dimension of said images.

References Cited

UNITED STATES PATENTS 2,976,361 3/1961 Stamps ............ 355—52 X

FOREIGN PATENTS 2,608,845 8/1927 Italy.

NORTON ANSHER, Primary Examiner

R. A. WINTERCORN, Assistant Examiner

U.S. Cl. X.R.

353—98; 355—66